March 16, 1965     D. B. MAGLEBY     3,173,295
FLUID BY-PASS DEVICE
Original Filed June 2, 1959
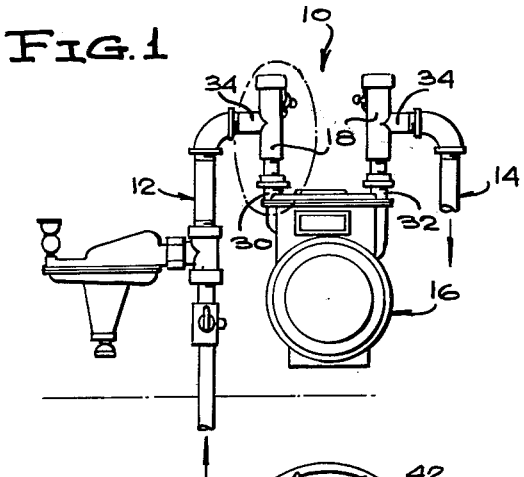
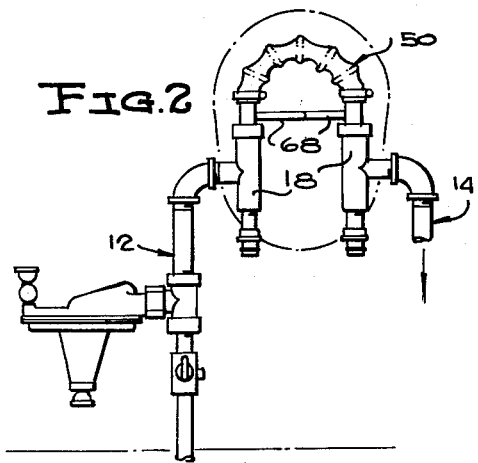
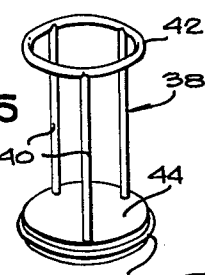
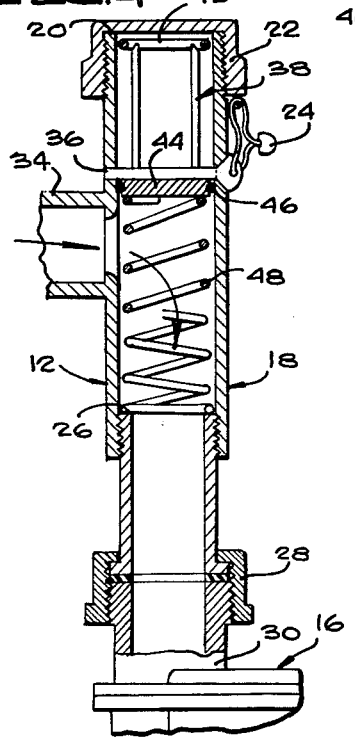
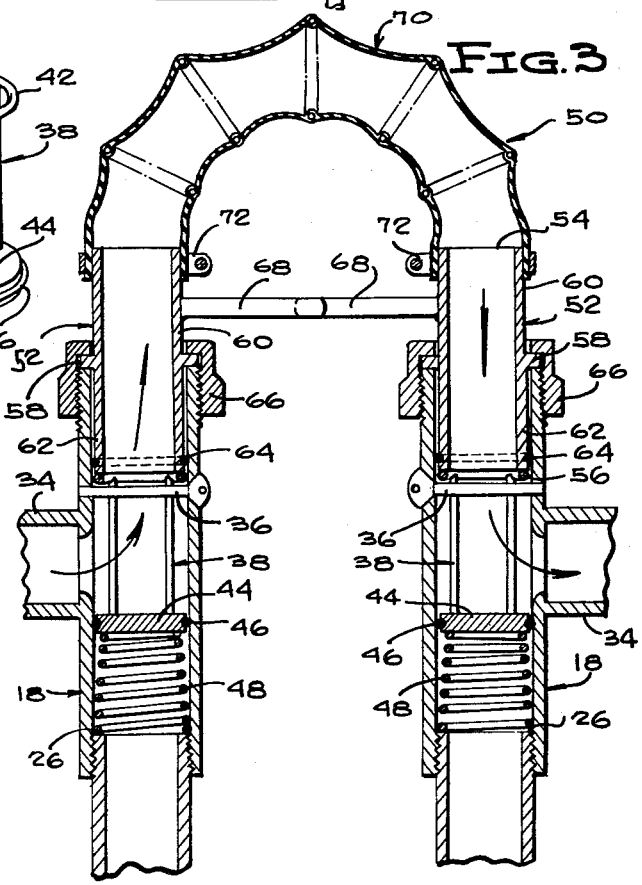
INVENTOR.
DONALD B. MAGLEBY
BY
McMorris, Berman & Davidson
ATTORNEYS United States Patent Office 3,173,295
Patented Mar. 16, 1965

3,173,295
FLUID BY-PASS DEVICE
Donald B. Magleby, 1618 Fuller Drive,
Salt Lake City, Utah
Continuation of application Ser. No. 817,577, June 2, 1959. This application Mar. 28, 1962, Ser. No. 186,582
20 Claims. (Cl. 73—201)

This is a continuation of my co-pending application Serial No. 817,577, filed June 2, 1959, for "Meter By-Pass Device," now abandoned.

This invention relates to a by-pass device for sealed connections at its opposite ends to the inlet and outlet conduits of a fluid line, such as a domestic gas line, so as to by-pass a meter or other flow through device installed between the conduits, and provide for continued flow of fluid to the utilization means connected to the outlet conduit, while the meter is removed for checking or replacement.

The primary object of the invention is to provide a simple, efficient, and easily applied by-pass device of the character indicated, which desirably does away with the trouble and expense of present meter removal and replacement practices, and eliminates the interruptions to service to which they involve, and makes feasible the removal and restoration, after checking, of an outside meter, or its replacement, without the present need to first locate and inform an occupant of the premises served of an interruption in service and of the necessity of shutting off appliances during the interruption of service involved in the present practices.

Another object of the invention is to provide a by-pass device of the character indicated above which is usable in, or adaptable to, use in connection with liquid pressure systems, as well as gas pressure systems.

Other important objects and advantageous features of the invention will be apparent from the following description and the accompanying drawings, wherein, for purposes of illustration only, a specific form of the invention is set forth in detail.

In the drawings:

FIGURE 1 is a schematic view of a conventional gas meter installation;

FIGURE 2 is a view like FIGURE 1, showing a device of the invention applied to the installation and the meter removed;

FIGURE 3 is an enlarged vertical longitudinal section taken through the encircled part of FIGURE 2;

FIGURE 4 is a similar view of the encircled part of FIGURE 1, showing the position of the dam or valve cage prior to application of a related part of said device; and, FIGURE 5 is an enlarged perspective view of a dam or valve cage.

Referring in detail to the drawings, wherein like numerals designate like parts throughout the several views, the numeral 10 generally designates a domestic gas meter installation comprising an inlet conduit 12, an outlet conduit 14 and a meter 16 connected therebetween.

The conduits 12 and 14 comprise vertical pipes 18 having open upper ends 20, on which closure caps 22 are secured, and which are usually guarded by wire seals 24. The pipes 18 have internal shoulders 26 at their lower ends, and have swivel couplings 28 threaded on their lower ends which connect thereto the upstanding inlet and outlet necks 30, 32 on the meter 16. The inlet and outlet conduits are connected in communication with the pipes 18 by means of lateral pipe arms 34 leading into the pipes 18 at points intermediate the upper and lower ends of the pipes 18. It is desirable for simplicity of manipulation that the pipes 18 be parallel to each other, whether vertically or horizontally positioned.

In the pipes 18 check bolts 36 extend thereacross on a level just above the lateral arms 34 and extend freely through and serve as stops for cylindrical valve or dam cages 38 which comprise circumferentially spaced bars 40 extending between and secured to upper open rings 42 and a lower, imperforate dam or valve discs 44 which have sealing ring gaskets 46 therearound, which bear against the sidewalls of the pipes 18. Helical springs 48 in the pipes 18 are compressed between the internal shoulders 26 and the undersides of the valve discs 44, and normally elevate the cages so as to put the valve discs 44 in closing relation to the pipes 18 at levels just above the lateral arms 24 where the discs 44 are in stop engagement with the check bolts 36, as shown in FIGURE 4.

The illustrated by-pass device, generally designated 50, comprises a pair of similar rigid tubes 52 having open upper and lower ends 54, 56 and external lateral stop flanges 58 intermediate their ends. The flanges 58 divide the tubes 52 into upper portions 60 and lower portions 62. The lengths of the lower portions 62 must be such that, when inserted in the upper ends 20 of the pipes 18, with the stop flanges 58 abutting these upper ends, the lower ends 56 of the tubes 52 engage the upper rings 42 of the cages 38 and depress the cages against the resistance of the springs 48, to levels that the valve discs 44 are slightly below the lateral pipe arms 34, as shown in FIGURE 3, from the normal elevated positions of the cages shown in FIGURE 4. The lower tube portions 56 are provided near their lower ends with external sealing rings 64, and the tubes are secured down in place in the pipes 18 by means of cap nuts 66 threaded on the upper ends of the pipes 18 and bearing upon the upper sides of the stop flanges 58. Rigid bars 68 extend laterally from the upper portions 56 of the tubes 52 and serve as handles for manipulating the device. The handle bars 68 are long enough to overlap so as to be grasped in one hand while the other hand is used to screw the caps 66 on the pipes 18.

The by-pass device 50 further comprises a flexible, wire supported hose 70 which is bent to U-shape and has its ends severally engaged over the upper ends of the tubes 52 and removably secured thereon, as by ring clamps 72.

In operation, it will be seen that in the normal elevated positions of the valve cages 38 in the pipes 18, at locations above the lateral arms 34, gas or other fluid is confined to flow downwardly in the inlet pipe 18 to one side of the meter 16, through the meter, and upwardly through the outlet pipe 18 to the utilization means (not shown). However, when the device 50 is installed as above described, the valve cage discs are below the lateral arms 34 of the pipes 18, so that gas is confined to flow, instead, upwardly through the inlet conduit pipe 18 to and through the device 50, and downwardly therefrom into the upper end of the outlet pipe 18, and thence to the utilization means, so that the meter 16 can be disconnected from the lower ends of the pipes 18, without interrupting the flow of gas or fluid to the utilization means, and the same or another meter can be reconnected to the lower ends of the pipes 18 also without such interruptions. When a meter has been thus reconnected, the device 50 is removed by loosening the cap nuts 66, whereat the valve cages 38 are raised by the springs 48, and seal the interiors of the pipes 18 above the lateral arms 34 and restore flow through the meter.

A reason for having the hose 70 flexible is to facilitate purging of the device 50 of air, by first inserting the inlet tube 52 in the inlet pipe 18, with the outlet tube free of the outlet pipe, so that gas thereby released into the device 50 pushes out air present therein through the outlet tube. Thereupon, the outlet tube 52 is inserted and secured in place in the outlet pipe 18. For air-purging of a meter as the same is restored in the installation, this procedure is reversed.

While there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

I claim:

1. A pressure flow meter installation comprising an inlet conduit and an outlet conduit, parallel open ended inlet and outlet pipes having lateral arms opening thereinto at points intermediate the ends of the pipes, means severally connecting the inlet conduit to the lateral arm of the inlet pipe and the outlet conduit to the lateral arm of the outlet pipe, said pipes having first and second ends, a meter having inlet and outlet necks, means removably connecting the second ends of the inlet and outlet pipes to related meter necks, removable caps closing the first ends of the pipes, said pipes having internal stop shoulders at said second ends, valve cages sliding in said pipes having valve discs, expanding springs in the pipes compressed between the stop shoulders and the valve cages and normally positioning the valve cages in the pipes with their valve discs at the sides of the lateral arms remote from the meter so as to confine flow of fluid between the inlet and outlet conduits to the meter, and a by-pass device comprising open ended inlet and outlet tubes having external stop flanges intermediate their ends, said tubes having first and second ends, and a hose extending between and connected to the first ends of the tubes, the second ends of said tubes being insertable in the first ends of said pipes on removal of the closure caps, as far as said stop flanges so as to engage and move the valve cages in the pipes, against the resistance of the springs to positions wherein their valve discs are positioned at the sides of the lateral arms nearest the meter, so as to confine flow of fluid from the inlet conduit to the outlet conduit to the by-pass device.

2. A pressure flow meter installation comprising an inlet conduit and an outlet conduit, parallel open ended inlet and outlet pipes having lateral arms opening thereinto at points intermediate the ends of the pipes, means severally connecting the inlet conduit to the lateral arm of the inlet pipe and the outlet conduit to the lateral arm of the outlet pipe, said pipes having first and second ends, a meter having inlet and outlet necks, means removably connecting the second ends of the inlet and outlet pipes to related meter necks, removable caps closing the first ends of the pipes, said pipes having internal stop shoulders at said second ends, valve cages sliding in said pipes having valve discs, expanding springs in the pipes compressed between the stop shoulders and the valve cages and normally positioning the valve cages in the pipes with their valve discs at the sides of the lateral arms remote from the meter so as to confine flow of fluid between the inlet and outlet conduits to the meter, and a by-pass device comprising open ended inlet and outlet tubes having external stop flanges intermediate their ends, said tubes having first and second ends, and a hose extending between and connected to the first ends of the tubes, the second ends of said tubes being insertable in the first ends of said pipes on removal of the closure caps, as far as said stop flanges so as to engage and move the valve cages in the pipes, against the resistance of the springs to positions wherein their valve discs are positioned at the sides of the lateral arms nearest the meter, so as to confine flow of fluid from the inlet conduit to the outlet conduit to the by-pass device, said valve cages having open rings spaced from their valve discs, said pipes having removable check bolts extending thereacross and positioned between the rings and the discs of the cages, said check bolts being insertable across the pipes to stop the cages in normal meter flow producing positions and in by-pass flow producing positions.

3. A pressure flow meter installation comprising an inlet conduit and an outlet conduit, parallel open ended inlet and outlet pipes having lateral arms opening thereinto at points intermediate the ends of the pipes, means severally connecting the inlet conduit to the lateral arm of the inlet pipe and the outlet conduit to the lateral arm of the outlet pipe, said pipes having first and second ends, a meter having inlet and outlet necks, means removably connecting the second ends of the inlet and outlet pipes to related meter necks, removable caps closing the first ends of the pipes, said pipes having internal stop shoulders at said second ends, valve cages sliding in said pipes having valve discs, expanding springs in the pipes compressed between the stop shoulders and the valve cages and normally positioning the valve cages in the pipes with their valve discs at the sides of the lateral arms remote from the meter so as to confine flow of fluid between the inlet and outlet conduits to the meter, and a by-pass device comprising open ended inlet and outlet tubes having external stop flanges intermediate their ends, said tubes having first and second ends, and a hose extending between and connected to the first ends of the tubes, the second ends of said tubes being insertable in the first ends of said pipes on removal of the closure caps, as far as said stop flanges so as to engage and move the valve cages in the pipes, against the resistance of the springs to positions wherein their valve discs are positioned at the sides of the lateral arms nearest the meter, so as to confine flow of fluid from the inlet conduit to the outlet conduit to the by-pass device, said tubes having cap nuts circumposed thereon to engage the sides of the stop flanges remote from the second ends of the tubes and to thread on the first ends of the pipes to hold the tubes in place in the pipes.

4. A pressure flow meter installation comprising an inlet conduit and an outlet conduit, parallel open ended inlet and outlet pipes having lateral arms opening thereinto at points intermediate the ends of the pipes, means severally connecting the inlet conduit to the lateral arm of the inlet pipe and the outlet conduit to the lateral arm of the outlet pipe, said pipes having first and second ends, a meter having inlet and outlet necks, means removably connecting the second ends of the inlet and outlet pipes to related meter necks, removable caps closing the first ends of the pipes, said pipes having internal stop shoulders at said second ends, valve cages sliding in said pipes having valve discs, expanding springs in the pipes compressed between the stop shoulders and the valve cages and normally positioning the valve cages in the pipes with their valve discs at the sides of the lateral arms remote from the meter so as to confine flow of fluid between the inlet and outlet conduits to the meter, and a by-pass device comprising open ended inlet and outlet tubes having external stop flanges intermediate their ends, said tubes having first and second ends, and a hose extending between and connected to the first ends of the tubes, the second ends of said tubes being insertable in the first ends of said pipes on removal of the closure caps, as far as said stop flanges so as to engage and move the valve cages in the pipes, against the resistance of the springs to positions wherein their valve discs are positioned at the sides of the lateral arms nearest the meter, so as to confine flow of fluid from the inlet conduit to the outlet conduit to the by-pass device, said tubes having cap nuts circumposed thereon to engage the sides of the stop flanges remote from the second ends of the tubes and to thread on the first ends of the pipes to hold the tubes in place in the pipes, said tubes having external sealing rings thereon at locations between the stop flanges and the second ends of the tubes.

5. A pressure flow meter installation comprising an inlet conduit and an outlet conduit, parallel open ended inlet and outlet pipes having lateral arms opening thereinto at points intermediate the ends of the pipes, means severally connecting the inlet conduit to the lateral arm of the inlet pipe and the outlet conduit to the lateral arm of the outlet pipe, said pipes having first and second ends, a meter having inlet and outlet necks, means removably connecting the second ends of the inlet and outlet pipes to related meter necks, removable caps closing the first ends of the pipes, said pipes having internal stop shoulders at said second ends, valve cages sliding in said pipes having valve discs, expanding springs in the pipes compressed between the stop shoulders and the valve cages and normally positioning the valve cages in the pipes with their valve discs at the sides of the lateral arms remote from the meter so as to confine flow of fluid between the inlet and outlet conduits to the meter, and a by-pass device comprising open ended inlet and outlet tubes having external stop flanges intermediate their ends, said tubes having first and second ends, and a hose extending between and connected to the first ends of the tubes, the second ends of said tubes being insertable in the first ends of said pipes on removal of the closure caps, as far as said stop flanges so as to engage and move the valve cages in the pipes, against the resistance of the springs to positions wherein their valve discs are positioned at the sides of the lateral arms nearest the meter, so as to confine flow of fluid from the inlet conduit to the outlet conduit to the by-pass device, laterally extending handles fixed to said tubes in overlapping relation to be gripped in one hand.

6. A pressure flow meter installation comprising an inlet conduit and an outlet conduit, parallel open ended inlet and outlet pipes having lateral arms opening thereinto at points intermediate the ends of the pipes, means severally connecting the inlet conduit to the lateral arm of the inlet pipe and the outlet conduit to the lateral arm of the outlet pipe, said pipes having first and second ends, a meter having inlet and outlet necks, means removably connecting the second ends of the inlet and outlet pipes to related meter necks, removable caps closing the first ends of the pipes, said pipes having internal stop shoulders at said second ends, valve cages sliding in said pipes having valve discs, expanding springs in the pipes compressed between the stop shoulders and the valve cages and normally positioning the valve cages in the pipes with their valve discs at the sides of the lateral arms remote from the meter so as to confine flow of fluid between the inlet and outlet conduits to the meter, and a by-pass device comprising open ended inlet and outlet tubes having external stop flanges intermediate their ends, said tubes having first and second ends, and a hose extending between and connected to the first ends of the tubes, the second ends of said tubes being insertable in the first ends of said pipes on removal of the closure caps, as far as said stop flanges so as to engage and move the valve cages in the pipes, against the resistance of the springs to positions wherein their valve discs are positioned at the sides of the lateral arms nearest the meter, so as to confine flow of fluid from the inlet conduit to the outlet conduit to the by-pass device, rigid lateral handle bars extending inwardly from said tubes to overlap each other, said hose being flexible and having clamps on its ends securing its ends on the first ends of the tubes.

7. A by-pass arrangement for a fluid meter adapted to be connected between inlet and outlet conduits and to be by-passed by by-pass conduit means detachably connectable to said arrangement and having means associated therewith for operating said arrangement comprising: a pair of inlet and outlet one-piece T fittings, each having a cross bore and a lateral stem bore intermediate said cross bore, said fittings being arranged in spaced relation with their cross bores substantially parallel; means on said fittings for detachably connecting a meter to corresponding ends of said cross bores; means on said fittings for detachably connecting by-pass conduit means to the other ends of said cross bores; means on said fittings for detachably connecting inlet and outlet conduits to the lateral bores of said inlet and outlet fittings, respectively; and valve means reciprocable in the cross bore of each of said fittings and movable between two positions, a meter position wherein flow is blocked between the lateral bore and the said other end of said cross bore, and a by-passing position wherein flow is blocked between the lateral bore and said meter end of said cross bore, said valve means in moving between said two positions being adapted to pass through an intermediate position wherein flow can take place between said lateral bore and both ends of said cross bore.

8. The structure defined in claim 7 including means associated with each valve means and engageable by means associated with the by-pass conduit means for moving said valve means between its two positions.

9. The structure defined in claim 7 including spring means in each fitting engaged with the valve means therein for urging the latter to its meter position.

10. The structure defined in claim 7 including by-pass conduit means flexible between the ends thereof and attachable to the other ends of the cross bores of the fittings.

11. The structure defined in claim 10 including means associated with the by-pass conduit means and engageable with the valve means in both of the fittings for moving said valve means from their meter to their by-passing positions.

12. A by-pass arrangement for a fluid meter comprising: parallel open-ended inlet and outlet pipes, each having first and second ends and a lateral arm opening thereinto at a point intermediate said ends; means for detachably connecting said lateral arm of said inlet pipe to an inlet conduit; means for detachably connecting said lateral arm of said outlet pipe to an outlet conduit; means for detachably connecting said second ends of said pipes to a fluid meter; valve means reciprocable in each of said pipes and including a valve cage and a valve disc; compression spring means in each of said pipes engaged with said valve means therein for normally positioning the latter so that the corresponding valve disc is between the corresponding lateral arm and first end so as to confine flow of fluid between the inlet and outlet conduits to the meter; and a by-pass device comprising open-ended inlet and outlet tubes and a hose extending between and connecting the same, said tubes being insertable in said first ends of said corresponding pipes so as to engage and move said valve means therein to a position wherein the corresponding valve disc is located between the corresponding lateral arm and second end so as to confine flow of fluid from the inlet conduit to the outlet conduit to the by-pass device; and means for removably securing said by-pass device to said first ends of said pipes.

13. A by-pass arrangement for a fluid meter having an inlet adapted to be supplied with fluid from a supply conduit and having an outlet adapted to deliver fluid to a delivery conduit, and wherein the meter is adapted to be by-passed by a by-pass conduit detachably connectable to said arrangement and having means associated therewith for operating said arrangement comprising: a pair of inlet and outlet fitting means, said inlet fitting means having a supply inlet and two outlets, one a meter outlet and the other a by-pass outlet, and said outlet fitting means having a delivery outlet and two inlets, one a meter inlet and the other a by-pass inlet; removable closures for said by-pass outlet and said by-pass inlet; means on said inlet fitting means for detachably connecting to said supply inlet a supply conduit and to said meter outlet the inlet of a meter; means on said outlet fitting means for detachably connecting to said delivery outlet a delivery conduit and to said meter inlet the outlet of a meter; means on said fitting means for detachably connecting a by-pass conduit to and between said by-pass outlet and said by-pass inlet when said closures are removed; valve means within said inlet fitting means movable between a first position, wherein flow through said by-pass outlet is blocked and flow can take place from said supply inlet to said meter outlet, and a second position, wherein flow can take place from said supply inlet through said by-pass outlet when said closure therefor is removed and flow through said meter outlet is blocked; valve means within said outlet fitting means movable between a first position, wherein flow through said by-pass inlet is blocked and flow can take place from said meter inlet to said delivery outlet, and a second position, wherein flow can take place through said by-pass inlet, when said closure therefor is removed, to said delivery outlet and flow through said meter inlet is blocked; said valve means of said inlet fitting means and of said outlet fitting means being accessible through said by-pass outlet and said by-pass inlet, respectively, and being engageable by means associated with a by-pass conduit for moving said valve means from their said first to their said second positions; and means associated with each of said fitting means and with the corresponding valve means for retaining the latter in its said first position.

14. The setructure defined in claim 13 in which the fitting means are T's each having a stem bore and a cross bore, said stem bores constituting the supply inlet and delivery outlet, respectively, and in which the valve means are reciprocable in said cross bores of said T's.

15. The structure defined in claim 13 including a by-pass conduit; means associated with the opposite ends of said by-pass conduit for cooperation with the corresponding means on the fitting means to detachably connect said ends respectively to the by-pass outlet and the by-pass inlet when the closures are removed; and additional means associated with said ends for engagement with the corresponding valve means to move the latter from their first to their second positions.

16. The structure defined in claim 13 including a supply conduit and a delivery conduit respectively detachably connected to the supply inlet and the delivery outlet.

17. The structure defined in claim 16 including a by-pass conduit; means associated with the opposite ends of said by-pass conduit for cooperation with the corresponding means on the fitting means to detachably connect said ends respectively to the by-pass outlet and the by-pass inlet when the closures are removed; and additional means associated with said ends for engagement with the corresponding valve means to move the latter from their first to their second positions.

18. A by-pass type fluid meter fitting comprising: a fluid line; a fluid meter detachably connected into said line; a first valve connected into said line upstream of said meter and having a body provided with a by-pass port and a removable closure for said port, said valve having at least two positions, a meter position wherein flow takes place to said meter and flow to said port is blocked, and a by-pass position wherein flow takes place to said port and flow to said meter is blocked, said valve in moving between said positions being adapted to pass through an intermediate position wherein said flow takes place to both said by-pass port and said meter; a second valve connected into said line downstream of said meter and having a body provided with a by-pass port and a removable closure for said port, said second valve having at least two positions, a meter position wherein flow takes place from said meter and flow from said port is blocked, and a by-pass position wherein flow takes place from said port and flow from said meter is blocked, said second valve in moving between its said positions being adapted to pass through an intermediate position wherein flow takes place from both said meter and said port; and a by-pass line detachably connectable to and between said by-pass ports of said valves on removal of said closures.

19. In a by-pass arrangement for a fluid meter, the combination comprising: a pair of inlet and outlet T means, each having a through bore and a lateral opening communicating with said bore intermediate the ends thereof; means on said T means for detachably connecting thereto a fluid meter in communication with corresponding ends of said bores; means on said T means for detachably connecting thereto by-pass conduit means in communication with the other ends of said bores; means on said T means for detachably connecting thereto inlet and outlet conduits in communication with the lateral openings of said inlet and outlet T means, respectively; valve plug means reciprocable in said bore of each of said T means and movable between two positions, a meter position wherein flow is blocked between said lateral opening and said other end of said bore, and a by-pass position wherein flow is blocked between said lateral opening and said meter end of said bore, said valve plug means in moving between said two positions being adapted to pass through an intermediate position wherein flow can take place between said lateral opening and both ends of said bore; and means engaged between each of said valve plug means and its corresponding T means for removably retaining each said valve plug means in its said meter position.

20. In a by-pass arrangement for a fluid meter, the combination comprising: a pair of inlet and outlet T means, each having a through bore and a lateral opening communicating with said bore intermediate the ends thereof; means on said T means for detachably connecting thereto a fluid meter in communication with corresponding ends of said bores; means on said T means for detachably connecting thereto by-pass conduit means in communication with the other ends of said bores; means on said T means for detachably connecting thereto inlet and outlet conduits in communication with the lateral openings of said inlet and outlet T means, respectively; valve plug means reciprocable in said bore of each of said T means and movable between two positions, a meter position wherein flow is blocked between said lateral opening and said other end of said bore, and a by-pass position wherein flow is blocked between said lateral opening and said meter end of said bore, said valve plug means in moving between said two positions being adapted to pass through an intermediate position wherein flow can take place between said lateral opening and both ends of said bore; by-pass conduit means detachably connectable to said T means in communication with said other ends of said bores; and means associated with the opposite ends of said by-pass conduit means and engageable with the corresponding valve plug means for moving the latter from its said meter position to its said by-pass position.

References Cited by the Examiner
UNITED STATES PATENTS

| | | | |
|---|---|---|---|
| 2,397,265 | 3/46 | Jacobsson et al. | 137—607 |
| 2,414,451 | 1/47 | Christensen | 137—610 X |
| 2,548,957 | 4/51 | Di Rosa | 137—610 X |
| 2,579,656 | 12/51 | Douglas et al. | 73—201 |
| 2,748,600 | 6/56 | Allen | 73—201 |

RICHARD C. QUEISSER, *Primary Examiner.*

JOSEPH P. STRIZAK, *Examiner.*